United States Patent [19]

Shekhawat

[11] Patent Number: 4,961,129
[45] Date of Patent: Oct. 2, 1990

[54] CURRENT CONTROLLED ACTIVE FLYWHEEL TYPE NEUTRAL POINT CLAMPED INVERTER

[75] Inventor: Sampat S. Shekhawat, Middletown, N.J.

[73] Assignee: Allied-Signal, Inc., Morris Township, Morris County, N.J.

[21] Appl. No.: 445,065

[22] Filed: Dec. 4, 1989

[51] Int. Cl.$^5$ ............... H02M 1/12; H02M 7/521
[52] U.S. Cl. ........................... 363/40; 363/98; 363/132; 318/811
[58] Field of Search ............... 363/39–41, 363/98, 132, 136; 318/811

[56] References Cited

U.S. PATENT DOCUMENTS

| | | | |
|---|---|---|---|
| 4,443,841 | 4/1984 | Mikami et al. | 363/41 |
| 4,635,177 | 1/1987 | Shekhawat et al. | 363/132 X |
| 4,670,828 | 6/1987 | Shekhawat et al. | 363/132 X |

Primary Examiner—William H. Beha, Jr.
Assistant Examiner—Emanuel T. Voeltz
Attorney, Agent, or Firm—Glen M. Diehl

[57] ABSTRACT

A power inverter having a neutral clamping circuit which is controlled for low harmonic output. The power inverter includes power transistors, a current sensor at the inverter output and a neutral clamping circuit connected between the inverter output and a neutral point in a DC power source which supplies the inverter. A controller circuit is connected to the current sensor, to the power transistors and to the neutral clamping circuit to selectively enable and disable the power transistors in the neutral clamping circuit in accordance with the inverter operation and current direction at the inverter output to minimize current transients at the load.

24 Claims, 4 Drawing Sheets

CURRENT CONTROLLED ACTIVE FLYWHEEL TYPE NEUTRAL POINT CLAMPED INVERTER

BACKGROUND OF THE INVENTION

This invention relates to power switching circuits. More specifically, it relates to a power inverter having a clamped neutral point and which provides an output having reduced harmonic content.

Conventional inverters provide a pair of power transistors connected in series between positive and negative DC terminals which operate on opposite half cycles to produce an AC output. These power inverters, however, have outputs with high harmonic content and further do not function well with reactive loads. Under such load conditions, reactive currents at the output result in a nonideal output voltage waveform having increased having harmonic content.

An attempt to reduce the harmonic content of the output of a power inverter is illustrated in U.S. Pat. No. 4,443,841 (hereinafter Mikami). In Mikami, each AC phase output terminal is clamped to a neutral terminal in a DC power source by a clamping circuit comprised of two transistors. One of the transistors in the clamping circuit is enabled during a positive cycle of inverter operation as well as for a short time therebefore and thereafter. The other transistor in the clamping circuit is enabled during the negative cycle of inverter operation as well as for a short time therebefore and thereafter. In this way, the potential of each AC phase output terminal is never permitted to change from that of a positive terminal in the DC power source directly to that of a negative terminal in the DC power source, or vice versa. Mikami, however, does not respond to reactive currents which can be generated as a result of reactive loads.

An inverter having an output waveform with low distortion and low harmonic content particularly for use with reactive loads, therefore, is needed.

SUMMARY OF THE INVENTION

The present invention is a power inverter having a neutral clamped circuit which is controlled in accordance with the direction of current at the inverter output. The inverter preferably includes a DC power source, a first power transistor connected between a positive terminal in the DC power source and an inverter output terminal, which transistor is selectively enabled and disabled to provide a positive AC voltage at the output terminal during a positive cycle of operation and a second power transistor connected between the output terminal and a negative terminal in the DC power source, which transistor is selectively enabled and disabled to provide a negative AC voltage at the output terminal during a negative cycle of inverter operation. The inverter further preferably includes a third and a fourth transistor, each connected between a neutral terminal in the DC power source and the output terminal. The third transistor, when enabled, provides a current path from the neutral terminal to the output terminal and the fourth transistor, when enabled, provides a current path in the opposite direction.

A current sensor, preferably a current transformer, is electromagnetically connected to the output terminal to sense the direction of current flow between the output terminal and the load. A controller circuit is connected to the output of the current sensor and to the third and fourth transistors for selectively enabling the third and fourth transistors.

In a preferred embodiment, the controller circuit enables the third transistor during the positive cycle of inverter operation as well as during the negative cycle of inverter operation if the second transistor is disabled and the current sensor senses current flow from the output terminal to a load connected to the inverter output terminal. The controller circuit further preferably enables the fourth transistor during the negative cycle of inverter operation as well as during the positive cycle of inverter operation if the first transistor is disabled and the current sensor senses current flow from the load to the output terminal. The controller circuit also preferably provides control signals for the first and second transistors to obtain the desired AC output.

It is an object of the present invention to provide an inverter having an output with lower harmonic distortion;

It is a further object of the present invention to provide an inverter having a freewheeling diode associated with the power transistor that is reduced in size and rating.

These and other objects will become apparent on review of the following drawings and specification.

DESCRIPTION OF THE PREFERRED EMBODIMENT

Figure 1:
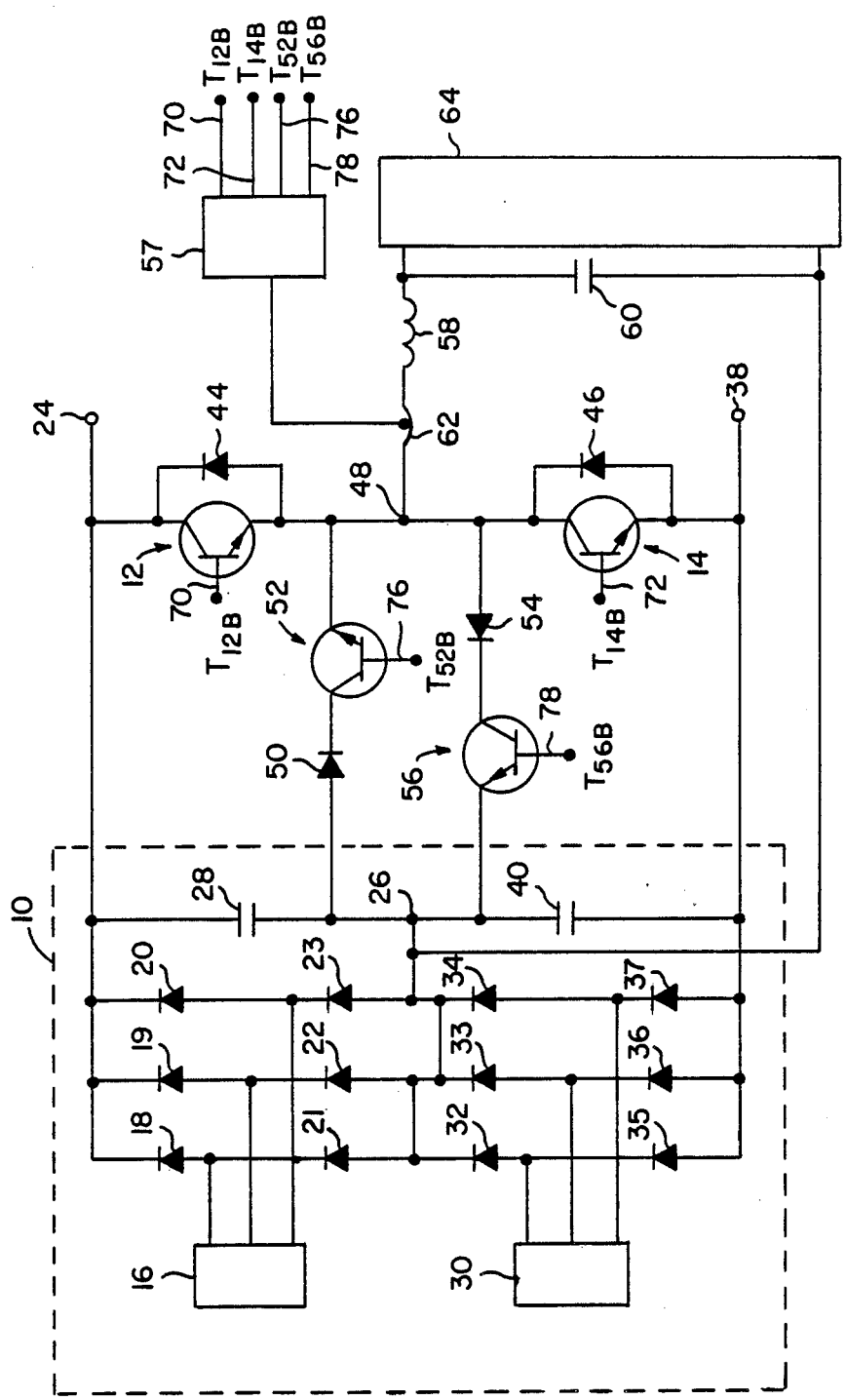
FIG. 1 illustrates a neutral point clamped power inverter in accordance with the present invention.

FIG. 1 illustrates a neutral point clamped power inverter in accordance with a preferred embodiment of the present invention. The power inverter has a DC power supply 10 for supplying DC voltages to a power switch 12 and a power switch 14. A desired positive voltage is generated during a positive cycle of inverter operation by the selective enabling and disabling of the power switch 12. Similarly, a desired negative voltage is generated during a negative cycle of inverter operation by the selective enabling and disabling of the power switch 14. The switches 12 and 14 can be controlled by predetermined control signals or varied in accordance with a feedback circuit to obtain the desired AC output voltage.

The DC power supply 10 preferably includes a first three-phase AC supply 16. The three-phase AC voltage generated by the supply 16 is full-wave rectified by a bridge circuit comprising the diodes 18 to 23. A DC voltage is thereby generated across a positive terminal 24 and a neutral terminal 26. A capacitor 28 smooths this DC voltage.

The DC power supply 10 preferably further includes a second source 30 of a three-phase AC voltage. The output from the supply 30 is full wave rectified by a bridge circuit comprising diodes 32 to 37. A DC voltage is thereby generated across the neutral terminal 26 and a negative terminal 38. A capacitor 40 smooths this DC voltage.

The terminal 26 forms a neutral point in the DC supply 10 between the positive terminal 24 and the negative terminal 38. The switches 12 and 14 are connected in series between the positive terminal 24 and the negative terminal 38. The switch 12 is preferably a power npn transistor having a collector connected to the terminal 24, an emitter connected to an inverter output terminal 48 and a base which is selectively controlled such that the desired positive voltage is developed at the terminal 48 during a positive cycle of inverter operation. The switch 14 is also preferably a npn transistor which has an emitter connected to the negative terminal 38, a collector connected to the terminal 48 and a base which is selectively controlled such that the desired negative voltage is developed at the terminal 48 during a negative cycle of inverter operation.

A freewheeling diode 44 has an anode connected to the inverter output terminal 48 and a cathode connected to the positive terminal 24. This diode 44 provides a freewheeling current path from the output terminal 48 to the positive terminal 24 so as to protect the transistor 12 from damage if the transistors 52 and 56 do not turn on at the correct times. Similarly a freewheeling diode 46 has a cathode connected to the output terminal 48 and an anode connected to the negative terminal 38 so as to similarly protect the transistor 14.

The power inverter of the present invention further has a clamping circuit connected between the neutral terminal 26 in the DC source 10 and the inverter output terminal 48. In a preferred embodiment, the clamping circuit comprises a diode 50 and a switch 52 which are connected in series between the terminals 26 and 48 to provide a current path from the neutral terminal 26 to the output terminal when the switch 52 is enabled. The switch 52 is preferably a power npn transistor. The diode 50 has an anode connected to the neutral terminal 26 and a cathode connected to the collector of the transistor 52. The transistor 52 has an emitter connected to the inverter output terminal 48. The neutral terminal 26 and the output terminal 48 are preferably further clamped by a circuit comprising a series connection of a diode 54 and a switch 56 arranged to provide a current path from the output terminal 48 to the neutral terminal 26 when the switch 56 is enabled. The switch 56 is preferably a power npn transistor. The diode 54 has an anode connected to the terminal 48 and a cathode connected to the collector of the transistor 56. The transistor 56 has an emitter connected to the neutral terminal 26. Each of the transistors 52 and 56 has a base connected to a controller circuit 57. The controller circuit 57 selectively enables and disables the transistors 52 and 56 to minimize output harmonics.

The output of the inverter is filtered by an inductor 58 and a capacitor 60 and is connected to a load 64. Further, the direction of the current between the output terminal 48 and the load 64 is sensed by a current sensor 62, for example, a current transformer 62 which is electromagnetically connected between the output terminal 48 and the load 64. The output of the current transformer 62 is supplied to the controller circuit 57 to aid in the control of the transistors 52 and 56.

As stated previously, the transistors 52 and 56 are controlled by the controller circuit 57 so as to minimize the harmonic content of the inverter output. In one embodiment, the transistor 52 is enabled whenever current flow in the inverter output—as sensed by the current transformer 62—is from the output terminal 48 to the load 64 if the transistor 14 is disabled. This provides a current path from the neutral terminal 26 to the output terminal 48, thereby clamping the potential of the output terminal 48 relative to the potential of the neutral terminal 26. The transistor 56 is enabled whenever current flow in the inverter output is from the load 64 to the output terminal 48 if the transistor 12 is disabled. This provides a current path from the output terminal 48 to the neutral terminal 26, thereby clamping the potential of the output terminal 48 relative to the potential of the neutral terminal 26. This operation reduces the harmonic content of the inverter output.

Figure 2:
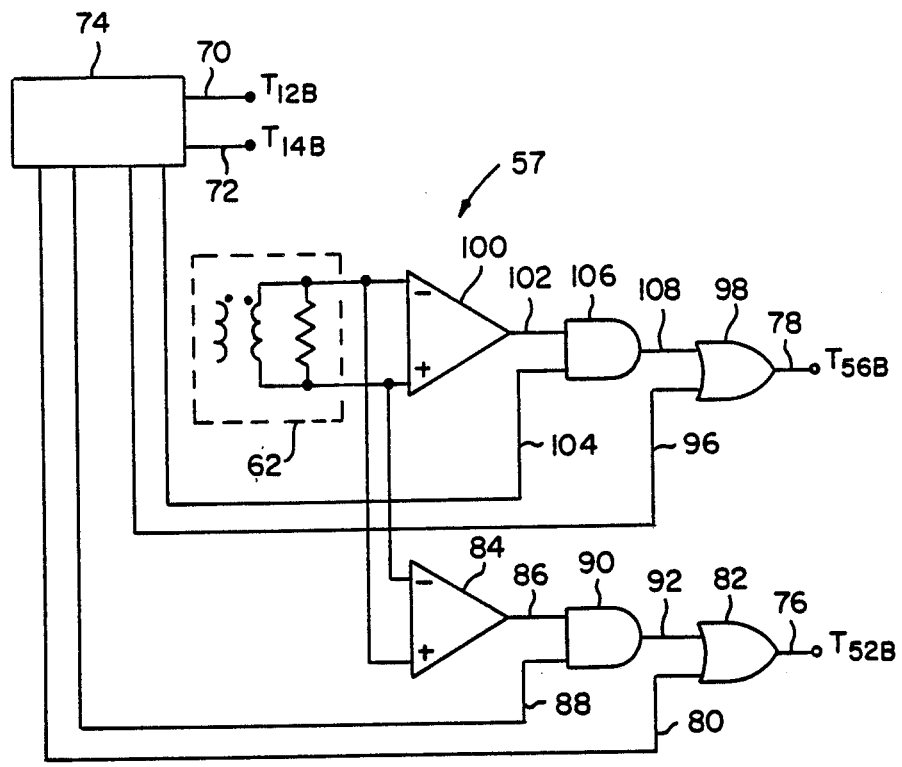
FIG. 2 illustrates a preferred controller circuit.
Figure 3:
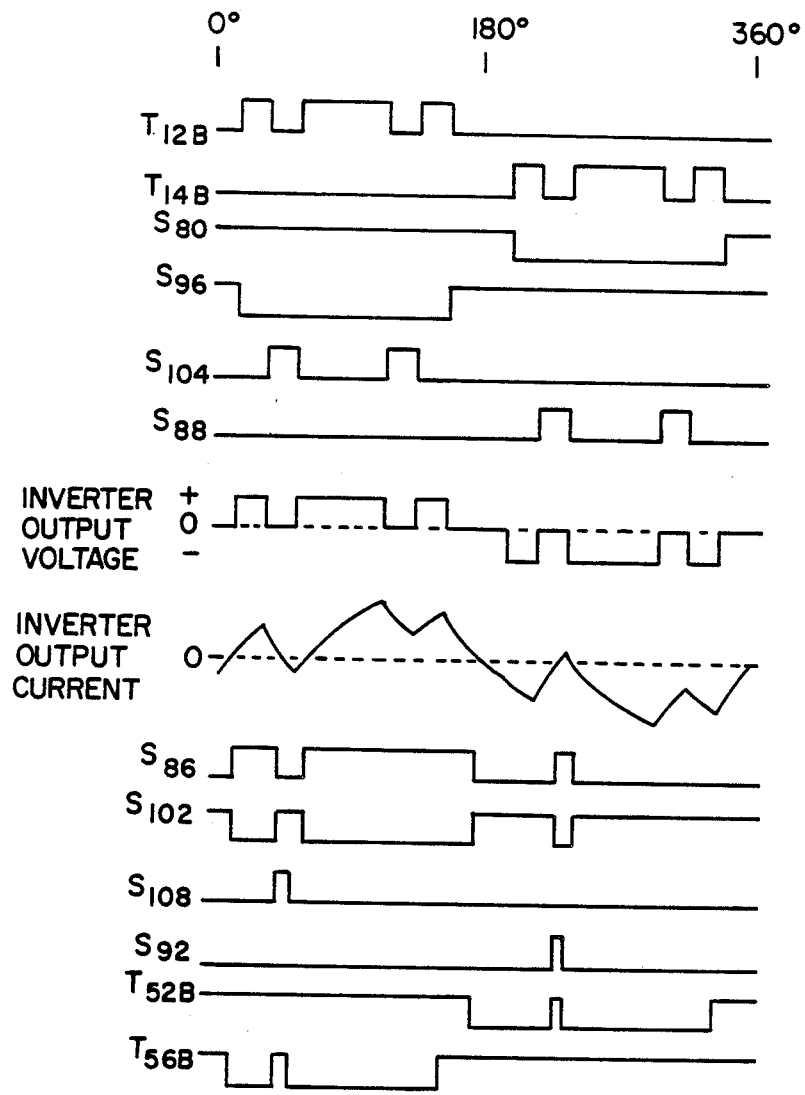
FIG. 3 illustrates control signals for the clamping circuit of FIG. 1 and the resulting operational voltages.

In a preferred embodiment, as illustrated in FIGS. 2 and 3, the transistors 52 and 56 are enabled more frequently. FIG. 2 illustrates a preferred controller circuit 57. FIG. 3 illustrates the control signals generated by the controller circuit 57 and the resulting operational signals in the inverter. It is preferred to enable the transistor 52 during the positive cycle of inverter operation as well as during the negative cycle of inverter operation if the transistors 12 and 14 are disabled and the current sensor 62 senses current flow from the terminal 48 to the load 64, that is a positive current. It is also preferred to enable the transistor 56 during the negative cycle of inverter operation as well as during the positive cycle of inverter operation if the transistors 12 and 14 are disabled and the current sensor 62 senses current direction from the load 64 to the terminal 48, that is a negative current.

The controller circuit 57 outputs a first control signal on a line 70 which is connected to the base of the transistor 12 for selectively enabling and disabling the power transistor 12 during the positive cycle of inverter operation to obtain the desired positive output voltage. Referring to FIG. 3, this control signal is indicated as T12B. During the times the control signal $T_{12B}$ is high, the transistor 12 causes the potential of the output terminal 48 to be clamped relative to the potential of the positive terminal 24, thereby positively biasing the output voltage, which is indicated in FIG. 3 as INVERTER OUTPUT VOLTAGE. The controller circuit 57 further outputs a second control signal, $T_{14B}$, on a control line 72 which is connected to the base of the power transistor 14 to selectively disable and enable the power transistor 14 during the negative cycle of inverter operation to obtain the desired negative voltage. During the times the control signal $T_{14B}$ is high, the transistor 14 causes the potential at the output terminal 48 to be clamped relative to the potential of the negative terminal 38, thereby negatively biasing the output voltage as indicated by the signal INVERTER OUTPUT VOLTAGE. The control signals $T_{12B}$ and $T_{14B}$ are preferably generated by a pre-programmed state machine 74 in the controller circuit 57. These control signals can also be generated on-line by means of feedback from the inverter output.

The control signals, $T_{52B}$ and $T_{56B}$, which are applied to the base of the transistors 52 and 56, respectively, to minimize output harmonics are output from the controller circuit 57 on the control lines 76 and 78, respectively. To generate the preferred control signal, $T_{52B}$, the state machine 74 outputs control signals $S_{80}$ and $S_{88}$ on lines 80 and 88, respectively. Both of the control signals reflect the operational condition of the inverter. The control signal $S_{80}$ is high during a positive cycle of inverter operation, i.e. from approximately 0° to approximately 180° of operation, as indicated in FIG. 3. The control signal $S_{80}$ is fed to an input of an OR gate 82, the output of which is the control signal $T_{52B}$ for the transistor 52. As a result, the control signal $T_{52B}$ is high and the transistor 52 is enabled during the positive cycle of inverter operation. The control signal $S_{88}$ is high during the negative cycle of operation between approximately 180° and approximately 360° when the transistors 12 and 14 are disabled. The control signal $S_{88}$ is input to a first input of an AND gate 90. The second input of the gate 90 is a signal $S_{86}$ on line 86 from a differential amplifier 84 which is driven by the current transformer 62. The signal $S_{86}$ is high whenever the current transformer 62 senses a current flow from the terminal 48 to the load 64 (a positive current) and is low whenever current is in the opposite direction (negative). The output current is indicated as INVERTER OUTPUT CURRENT in FIG. 3. The signal, $S_{92}$, on line 92 from the output of the gate 90 is, therefore, high when there is current flow from the inverter to the load 64 if the transistors 12 and 14 are disabled. Since the signal $S_{92}$ is fed to a second input of the OR gate 82, the control signal $T_{52B}$ is high and the transistor 52 is similarly enabled, during the negative cycle of operation if the transistors 12 and 14 are disabled and the current flow is out of the inverter. The output voltage at the terminal 48, therefore, remains clamped relative to the potential of the neutral terminal 26 during the positive cycle of operation when the transistor 12 is disabled and during the negative cycle when reactive loads cause the output current to be positive if the transistors 12 and 14 are disabled, thereby reducing transients in the output and minimizing harmonics.

To generate the preferred control signal $T_{56B}$ the state machine 74 outputs control signals $S_{96}$ and $S_{104}$ on the lines 96 and 104, respectively. Both of these signals reflect the operational condition of the inverter. Signal $S_{96}$ is high during a negative cycle of inverter operation, i.e. from approximately 180° to approximately 360° as indicated in FIG. 3. The control signal $S_{96}$ is fed to an input of an OR gate 98, the output of which is the control signal $T_{56B}$ for the transistor 56. As a result, the signal $T_{56B}$ is high and the transistor 56 is enabled during the negative cycle of inverter operation. The control signal, $S_{104}$, which is high during the positive cycle of operation between 0° and 180° when the transistors 12 and 14 are disabled, is connected to a first input of an AND gate 106. The second input of the gate 106 is a signal $S_{102}$ on the line 102 from a differential amplifier 100 which is driven by the current transformer 62. The signal $S_{102}$ on the wire 102 is high whenever the current transformer 62 senses a current flow from the load 64 to the terminal 48 (a negative current) and is low whenever the current is in the opposite direction (a positive current). The signal, $S_{108}$, on line 108 from the output of the gate 106 is, therefore, high when the transistors 12 and 14 are disabled and when there is current flow into the inverter from the load 64. Since the signal $S_{108}$ is fed to a second input of the OR gate 98, the control signal $T_{56B}$ is high and the transistor 56 is enabled, during the positive cycle of operation when the current flow is into the inverter from the load if the transistors 12 and 14 are disabled. The output voltage at terminal 48, therefore, remains clamped relative to the potential of the neutral terminal 26 during the negative cycle of operation when the transistor 14 is disabled and during the positive cycle of operation when reactive loads cause the output current to be negative if the transistors 12 and 14 are disabled, thereby reducing transients in the output and minimizing harmonics.

Note that the control signals $S_{80}$ and $S_{96}$ which indicate a positive cycle of inverter operation and a negative cycle of inverter operation, respectively, preferably overlap. That is, the signal $S_{80}$ indicates a positive cycle of operation starting shortly before 0° and ending shortly after 180°. Similarly, the signal $S_{96}$ indicates a negative cycle of operation extending from shortly before 180° to shortly after 360°.

Figure 4:
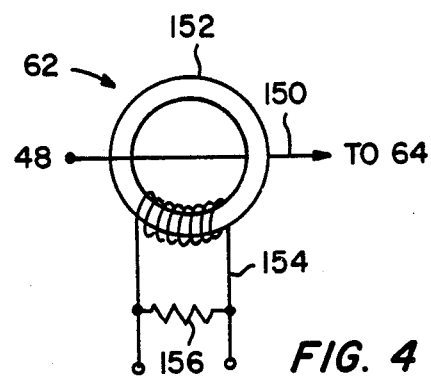
FIG. 4 illustrates a current transformer for use in sensing the output, current direction.

FIG. 4 illustrates a preferred current transformer 62. A wire 150 between the output terminal 48 and the load 64 passes through a magnetic metal doughnut 152. The wire 150 forms the primary in the transformer 62. A wire 154 is wound about the metal doughnut 152 to form the secondary of the transformer 62. A resistor 156 is provided between the two ends of the wire 154. When a current flows through the wire 150, equal number of ampere turns are induced in the secondary of the current transformer. The direction of the current in the wire 154 depends on the direction of the current in the wire 150.

Figure 5:
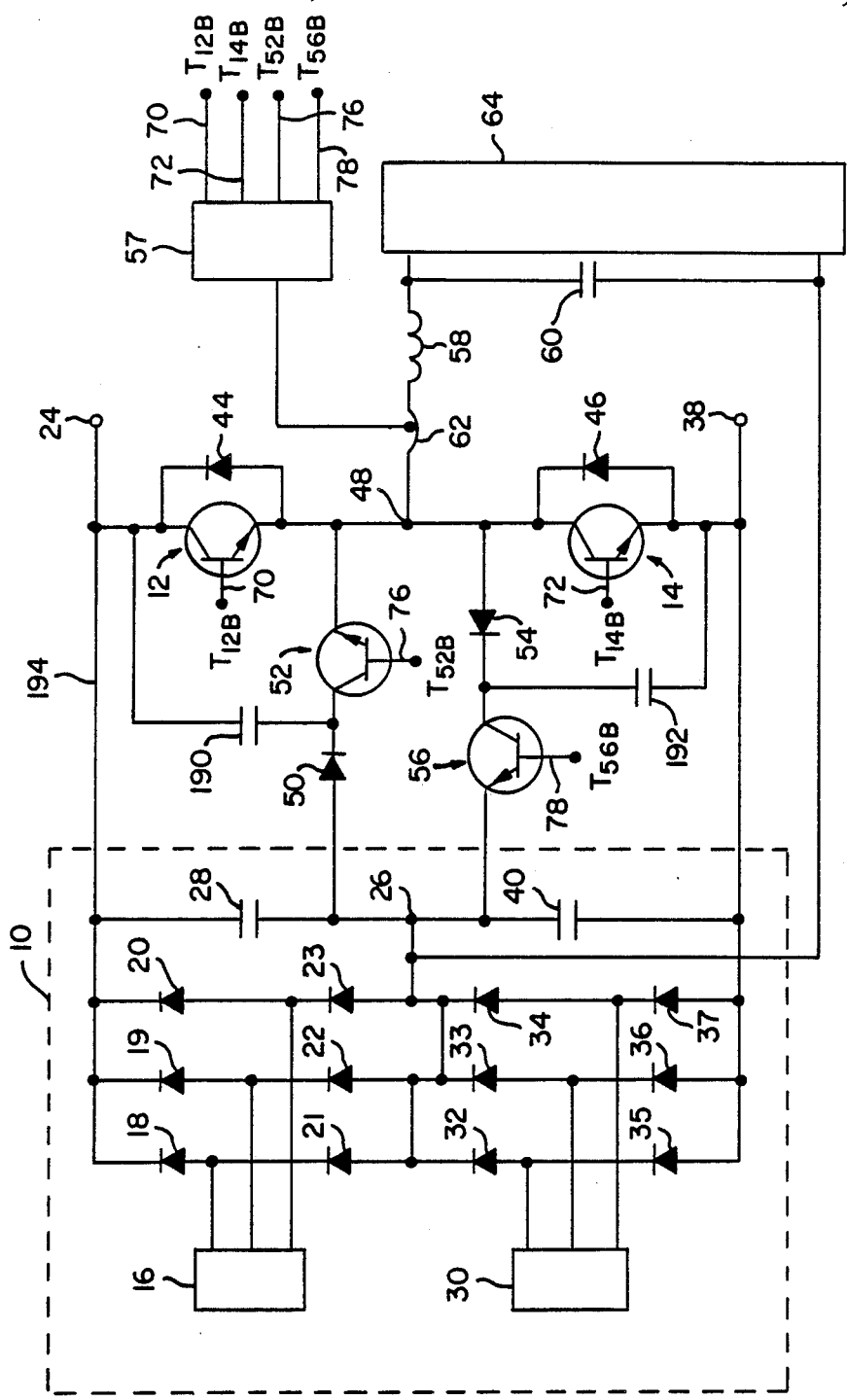
FIG. 5 illustrates a neutral clamped power inverter having a snubber circuit.

Referring to FIG. 5, the power inverter of FIG. 1 is illustrated having a snubber circuit comprising a capacitor 190 which is connected between the positive DC terminal 24 and the interconnection in the neutral clamping circuit of the cathode of the diode 50 and the collector of the transistor 52. Another snubber circuit comprising a capacitor 192 which is connected between the negative DC terminal 38 and the interconnection in the neutral clamping circuit of the cathode of the diodes 54 and the collector of the transistor 56, is also illustrated.

These snubber circuits are preferred to cancel parasitic inductances generated in the power inverter by the lengths of wires which interconnect the inverter components. For example, if the wire 194 creates a parasitic inductance of 1 micro Henry, a 500 Amp current pulse having a one micro second fall time on the wire 194 will induce a 500 Volt spike. To reduce the effects on the inverter operation, the transistors 52 and 56 are operated in accordance with the preferred embodiment illustrated in FIGS. 2 and 3. The transistor 52 is therefore, enabled during the positive cycle of inverter operation so as to provide a current path from the positive DC terminal 24 to the output terminal 48 through the capacitor 190 for the current spike. The transistor 56 similarly provides a current path from the negative terminal 38 through the capacitor 192 for current spikes.

I claim:

1. A power inverter for providing at a load an AC signal having a desired positive voltage during a positive cycle of operation and a desired negative voltage during a negative cycle of operation, comprising:
 a DC power source having a positive, a negative and a neutral terminal;
 first switching means connected between said positive terminal and an output terminal for positively biasing said output terminal when said first switching means is selectively enabled to obtain the desired positive voltage in the AC signal;
 second switching means connected between said negative terminal and said output terminal for negatively biasing said output terminal when said second switching means is selectively enabled to obtain the desired negative voltage in the AC signal;
 third switching means connected between said neutral terminal and said output terminal for providing a current path from said neutral terminal to said output terminal when enabled;

fourth switching means connected between said neutral terminal and said output terminal for providing a current path from said output terminal to said neutral terminal when enabled;

current sensing means connected between said output terminal and the load which can sense a current direction therebetween; and controller means connected to said current sensing means and to said third and fourth switching means for selectively enabling and disabling said third and fourth switching means in accordance with said current direction so as to minimize harmonics of said output.

2. The power inverter as claimed in claim 1, wherein said controller means is further connected to said first and second switching means for selectively enabling and disabling said first and second switching means to obtain a desired output voltage, said controller means further selectively enabling and disabling said third and fourth switching means in accordance with the enablement and disablement of said first and second switching means.

3. The power inverter as claimed in claim 1, wherein said controller means selectively enables and disables said third switching means when said sensed current direction is from said output terminal to the load if said second switching means is disabled and selectively enables and disables said fourth switching means when said current direction is from the load to said output terminal if said first switching means is disabled.

4. The power inverter as claimed in claim 3, wherein said controller means further enables said third switching means during the positive cycle of operation and enables said fourth switching means during the negative cycle of operation.

5. The power inverter as claimed in claim 4, wherein the positive and negative cycles of operation overlap such that the said third and said fourth switching means are both enabled for a time of inverter operation.

6. The power inverter as claimed in claim 1, wherein said first, second, third and fourth switching means are power transistors.

7. The power inverter as claimed in claim 6, wherein said first and second transistors are npn transistors, said first transistor having a collector connected to said positive terminal, an emitter connected to said output terminal and a base connected to said controller means, said second transistor having an collector connected to said output terminal, an emitter connected to said negative terminal and a base connected to said controller means.

8. The power inverter as claimed in claim 7, further comprising:

a first diode having an anode connected to said neutral terminal and a cathode connected to a collector of said third transistor, said third transistor having an emitter connected to said output terminal and a base connected to said controller means; and a second diode having an anode connected to said output terminal and a cathode connected to a collector of said fourth transistor, said fourth transistor having an emitter connected to said neutral terminal and a base connected to said controller means.

9. The power inverter as claimed in claim 8, further comprising:

a diode connected between said output terminal and said positive terminal for providing a current path from said output terminal to said positive terminal; and a diode connected between said negative terminal and said output terminal for providing a current path from said negative terminal to said output terminal.

10. The power inverter as claimed in claim 4, wherein said controller means comprises:

a state machine which generates a first and a second control signal for indicating the positive cycle of operation and the negative cycle of operation, respectively, and which generates a third control signal which indicates when said second switching means is disabled during the negative cycle of operation and a fourth control signal which indicates when said first switching means is disabled during the positive cycle of operation;

means to AND a signal from said current sensing means which indicates a current flow from said output terminal to the load with said fourth control signal to form a first output;

means to OR said first output with said second control signal to form a second output which controls said fourth switching means;

means to AND a signal from said current sensing means which indicates a current flow from the load to the output terminal with said third control signal to form a third output; and means to OR said third output with said first control signal to form a fourth output which controls said third switching means.

11. The power inverter as claimed in claim 10, wherein said third and fourth control signals overlap.

12. The power inverter as claimed in claim 10, wherein said state machine generates a fifth and a sixth control signal for selectively enabling and disabling said first and said second switching means, respectively.

13. A power inverter for providing at a load an AC signal having a desired positive voltage during a positive cycle of operation and a desired negative voltage during a negative cycle of operation, comprising:

a DC power source having a positive, a negative and a neutral terminal;

first switching means connected between said positive terminal and an output terminal for positively biasing said output terminal when said first switching means is selectively enabled to obtain the desired positive voltage in the AC signal;

second switching means connected between said negative terminal and said output terminal for negatively biasing said output terminal when said second switching means is selectively enabled to obtain the desired negative voltage in the AC signal;

third switching means connected between said neutral terminal and said output terminal for providing a current path from said neutral terminal to said output terminal when enabled;

fourth switching means connected between said neutral terminal and said output terminal for providing a current path from said output terminal to said neutral terminal when enabled;

current sensing means connected between said output terminal and the load for sensing current direction therebetween; and controller means connected to said current sensing means and to said third and fourth switching means for selectively enabling and disabling said third switching means when said current means detects a current flow from said output terminal to the load if said second switching means is disabled and for selectively enabling said fourth switching means when said current sensing means detects a current flow from the load to said output terminal if said first switching means is disabled.

14. The power inverter as claimed in claim 13, wherein said controller means further enables said third switching means during the positive cycle of operation and enables said fourth switching means during the negative cycle of operation.

15. The power inverter as claimed in claim 14, wherein the positive and negative cycles of operation overlap such that the said third and said fourth switching means are both enabled for a time of inverter operation.

16. The power inverter as claimed in claim 13, wherein said first, second, third and fourth switching means are power transistors.

17. The power inverter as claimed in claim 16, wherein said first and second transistors are npn transistors, said first transistor having a collector connected to said positive terminal, an emitter connected to said output terminal and a base connected to said controller means, said second transistor having an collector connected to said output terminal, an emitter connected to said negative terminal and a base connected to said controller means.

18. The power inverter as claimed in claim 17, further comprising:
a first diode having an anode connected to said neutral terminal and a cathode connected to a collector of said third transistor, said third transistor having an emitter connected to said output terminal and a base connected to said controller means; and
a second diode having an anode connected to said output terminal and a cathode connected to a collector of said fourth transistor, said fourth transistor having an emitter connected to said neutral terminal and a base connected to said controller means.

19. The power inverter as claimed in claim 18, further comprising:
a diode connected between said output terminal and said positive terminal for providing a current path from said output terminal to said positive terminal; and
a diode connected between said negative terminal and said output terminal for providing a current path from said negative terminal to said output terminal.

20. The power inverter as claimed in claim 16, wherein said controller means comprises:
a state machine which generates a first and a second control signal for indicating the positive cycle of operation and the negative cycle of operation, respectively, and which generates a third control signal which indicates when said second switching means is disabled during the negative cycle of operation and a fourth control signal which indicates when said first switching means is disabled during the positive cycle of operation;
means to AND a signal from said current sensing means which indicates a current flow from said output terminal to the load with said fourth control signal to form a first output;
means to OR said first output with said second control signal to form a second output which controls said fourth switching means;
means to AND a signal from said current sensing means which indicates a current flow from the load to the output terminal with said third control signal to form a third output; and
means to OR said third output with said first control signal to form a fourth output which controls said third switching means.

21. The power inverter as claimed in claim 20, wherein said third and fourth control signals overlap.

22. The power inverter as claimed in claim 20, wherein said state machine generates a fifth and a sixth control signal for selectively enabling and disabling said first and said second switching means, respectively.

23. A method for producing an AC voltage from a power inverter having a DC power source with positive, negative and neutral terminals, a first switch connected between the positive terminal and an output terminal, a second switch connected between the output terminal and the negative terminal, a third switch connected between the neutral terminal and the output terminal for providing a current path from the neutral terminal to the output terminal when enabled, a fourth switch connected between the neutral terminal and the output terminal for providing a current path from the output terminal to the neutral terminal when enabled, and a current sensor connected between the output terminal and a load, comprising the steps of:
selectively enabling and disabling the first switch to provide a positive output voltage during a positive cycle of operation;
selectively enabling and disabling the second switch to product a negative output voltage during a negative cycle of operation;
sensing the direction of current flow between the output terminal and the load;
enabling the third switch when the current sensor senses current flow from the output terminal to the load if the second switch is disabled; and
enabling the fourth switch when the current sensor senses current flow from the load to the output terminal if the first switch is disabled.

24. The method as claimed in claim 23, further comprising the step of:
enabling the third switch during the positive cycle of operation;
enabling the fourth switch during the negative cycle of operation.

* * * * *